(12) United States Patent
Akagawa et al.

(10) Patent No.: US 11,681,210 B2
(45) Date of Patent: Jun. 20, 2023

(54) ILLUMINATOR AND PROJECTOR

(71) Applicant: SEIKO EPSON CORPORATION, Tokyo (JP)

(72) Inventors: Tomoko Akagawa, Matsumoto (JP); Koichi Akiyama, Azumino (JP); Katsuyuki Uehara, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 32 days.

(21) Appl. No.: 17/446,104

(22) Filed: Aug. 26, 2021

(65) Prior Publication Data

US 2022/0066305 A1 Mar. 3, 2022

(30) Foreign Application Priority Data

Aug. 27, 2020 (JP) .............................. JP2020-143299

(51) Int. Cl.
*G03B 21/20* (2006.01)
(52) U.S. Cl.
CPC ....... *G03B 21/206* (2013.01); *G03B 21/2033* (2013.01); *G03B 21/2066* (2013.01)
(58) Field of Classification Search
CPC .... G03B 21/00; G03B 21/14; G03B 21/2033; G03B 21/2066; G03B 21/2073; G03B 21/006; G03B 21/008; G03B 21/16; G03B 21/28; G03B 21/145; G03B 21/204; G03B 21/206; G03B 21/2013; G03B 33/06; G03B 33/12; G02B 27/10; G02B 27/1006; H04N 9/315; H04N 9/3141; H04N 9/3152; H04N 9/3155; H04N 9/3161; H04N 9/3164; H04N 9/3167

USPC .......................................................... 353/20
See application file for complete search history.

(56) References Cited

U.S. PATENT DOCUMENTS

| | | | | |
|---|---|---|---|---|
| 9,942,528 B2* | 4/2018 | Akiyama | ............. | G03B 21/204 |
| 9,983,470 B2* | 5/2018 | Akiyama | ............. | G02B 27/283 |
| 10,101,647 B2* | 10/2018 | Takagi | ............... | G03B 21/2066 |
| 10,451,959 B2* | 10/2019 | Kamijima | .......... | G03B 21/2066 |
| 11,327,392 B2* | 5/2022 | Akiyama | ............. | G03B 21/208 |
| 2014/0268063 A1 | 9/2014 | Akiyama et al. | | |

(Continued)

FOREIGN PATENT DOCUMENTS

| | | |
|---|---|---|
| CN | 106990656 A | 7/2017 |
| JP | 2017-097310 A | 6/2017 |

(Continued)

*Primary Examiner* — Sultan Chowdhury
(74) *Attorney, Agent, or Firm* — Oliff PLC

(57) ABSTRACT

An illuminator includes a light source that outputs first light having a first wavelength band, a wavelength converter that converts the first light into second light having a second wavelength band different from the first, a first optical element that reflects part of the first light to cause the reflected first light to be incident on the wavelength converter and transmits the other part of the first light and the second light, and a second optical element that reflects the other part of the first light having the first wavelength band and passing through the first optical element, the direction of the reflected light being the traveling direction of the second light having the second wavelength band and passing through the first optical element, and transmits the second light having the second wavelength band and emitted from the wavelength converter.

12 Claims, 10 Drawing Sheets

(56) References Cited

U.S. PATENT DOCUMENTS

| | | | |
|---|---|---|---|
| 2015/0098065 A1* | 4/2015 | Tanaka | G03B 21/2013 |
| | | | 353/84 |
| 2017/0153538 A1 | 6/2017 | Kawasumi | |
| 2017/0208300 A1 | 7/2017 | Toyooka et al. | |
| 2018/0373132 A1 | 12/2018 | Miyazaki | |
| 2019/0004409 A1* | 1/2019 | Nishikawa | G03B 21/204 |
| 2020/0387059 A1* | 12/2020 | Takagi | F21K 9/64 |

FOREIGN PATENT DOCUMENTS

| | | |
|---|---|---|
| JP | 2017-129726 A | 7/2017 |
| JP | 2017-194523 A | 10/2017 |
| JP | 2019-008193 A | 1/2019 |

* cited by examiner

ILLUMINATOR AND PROJECTOR

The present application is based on, and claims priority from JP Application Serial Number 2020-143299, filed Aug. 27, 2020, the disclosure of which is hereby incorporated by reference herein in its entirety.

BACKGROUND

1. Technical Field

The present disclosure relates to an illuminator and a projector.

2. Related Art

As a light source apparatus used in a projector, there has been a proposed light source apparatus using fluorescence emitted from a phosphor when the phosphor is irradiated with excitation light outputted from a light emitter.

JP-A-2017-194523 discloses a light source apparatus including light sources that each output blue excitation light, a wavelength converter that converts the excitation light into fluorescence, a dichroic mirror that reflects the excitation light and transmits the fluorescence, and a focusing lens unit that guides the excitation light having exited out of the dichroic mirror to the wavelength converter.

In the light source apparatus disclosed in JP-A-2017-194523, part of the excitation light reflected off the wavelength converter is reflected off the dichroic mirror and returns toward the light source, so that part of the blue light usable as illumination light is lost, resulting in a problem of a decrease in light utilization efficiency.

SUMMARY

To solve the problem described above, a first aspect of the present disclosure provides an illuminator including a light source that outputs first light having a first wavelength band, a wavelength converter that converts the first light into second light having a second wavelength band different from the first wavelength band, a first optical element that reflects part of the first light having the first wavelength band to cause the reflected light to be incident on the wavelength converter and transmits another part of the first light having the first wavelength band and the second light having the second wavelength band and emitted from the wavelength converter, and a second optical element that reflects the other part of the first light having the first wavelength band and passing through the first optical element, a direction of the reflected light being a traveling direction of the second light having the second wavelength band and passing through the first optical element, and transmits the second light having the second wavelength band and emitted from the wavelength converter.

A second aspect of the present disclosure provides an illuminator including a light source that outputs first light having a first wavelength band, a wavelength converter that converts the first light into second light having a second wavelength band different from the first wavelength band, a first optical element that reflects a first polarized component that is part of the first light and is polarized in a first direction and transmits at least part of a second polarized component that is part of the first light and is polarized in a second direction that intersects the first direction, and a second optical element that includes a retardation film that converts the second polarized component passing through the first optical element into light polarized in the first direction and a reflection layer that reflects the second polarized component passing through the retardation film toward the retardation film.

A third aspect of the present disclosure provides a projector including the illuminator according to the first or second aspect of the present disclosure, a light modulator that modulates light from the illuminator in accordance with image information, and a projection optical apparatus that projects the light modulated by the light modulator.

DESCRIPTION OF EXEMPLARY EMBODIMENTS

First Embodiment

A first embodiment of the present disclosure will be described below with reference to the drawings.

In the following drawings, components are drawn at different dimensional scales in some cases for clarification of each of the components.

An example of a projector according to the present embodiment will be described.

Figure 1:
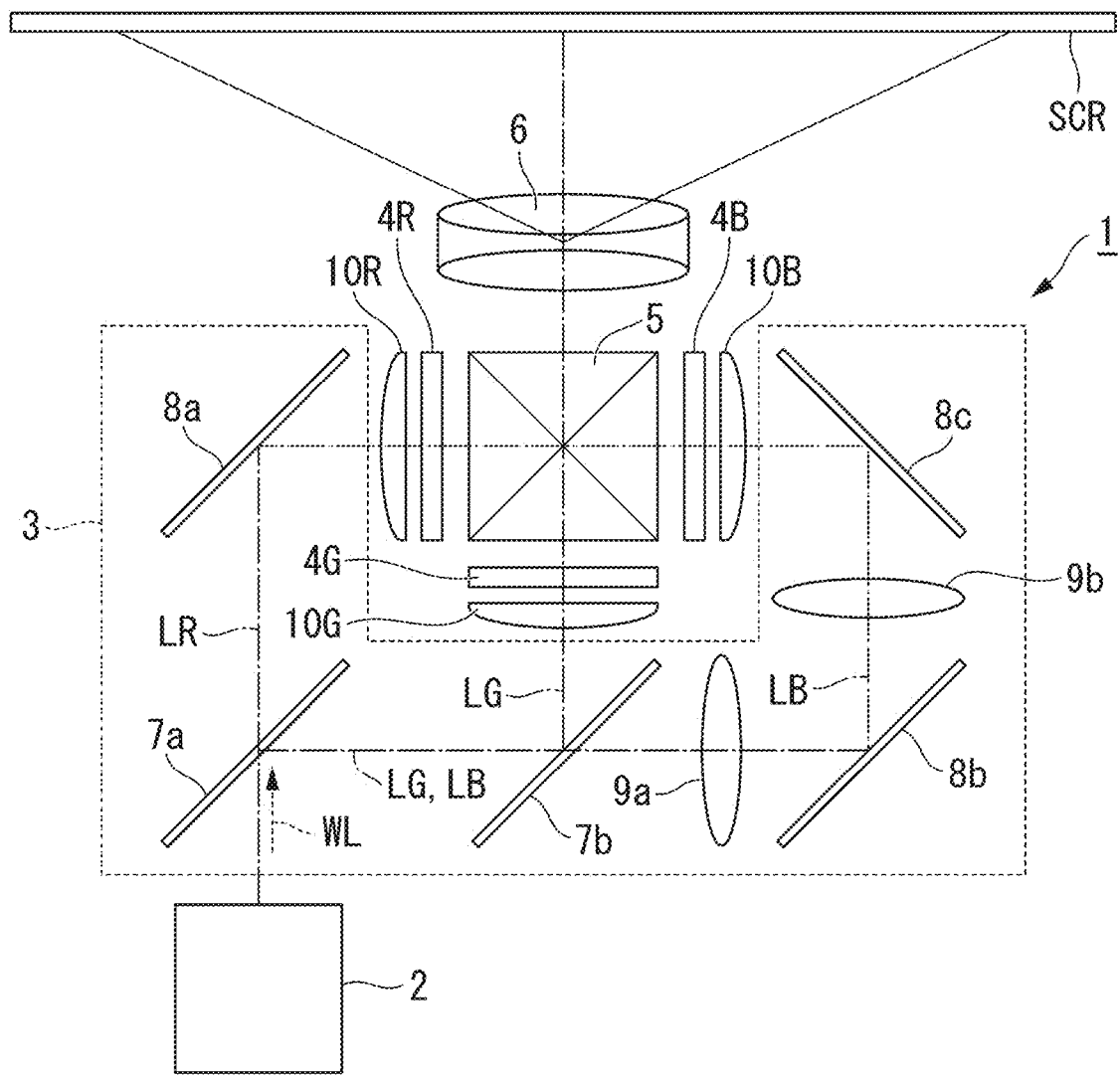
FIG. 1 is a schematic configuration diagram of a projector according to an embodiment.

FIG. 1 is a schematic configuration diagram of the projector according to the present embodiment.

A projector 1 according to the present embodiment is a projection-type image display apparatus that displays color video images on a screen SCR, as shown in FIG. 1. The projector 1 includes an illuminator 2, a color separation system 3, light modulators 4R, 4G, and 4B, a light combining system 5, and a projection optical apparatus 6. The configuration of the illuminator 2 will be described later.

The color separation system 3 includes a first dichroic mirror 7a, a second dichroic mirror 7b, reflection mirrors 8a, 8b, and 8c, and relay lenses 9a and 9b. The color separation system 3 separates illumination light WL outputted from the illuminator 2 into red light LR, green light LG, and blue light LB, guides the red light LR to the light modulator 4R, guides the green light LG to the light modulator 4G, and guides the blue light LB to the light modulator 4B.

A field lens 10R is disposed between the color separation system 3 and the light modulator 4R, substantially parallelizes incident light, and causes the resultant light to travel toward the light modulator 4R. A field lens 10G is disposed between the color separation system 3 and the light modulator 4G, substantially parallelizes incident light, and causes the resultant light to exit toward the light modulator 4G. A field lens 10B is disposed between the color separation system 3 and the light modulator 4B, substantially parallelizes incident light, and causes the resultant light to travel toward the light modulator 4B.

The first dichroic mirror 7a transmits a red light component and reflects a green light component and a blue light component. The second dichroic mirror 7b reflects the green light component and transmits the blue light component. The reflection mirror 8a reflects the red light component. The reflection mirrors 8b and 8c reflect the blue light component.

The red light LR having passed through the first dichroic mirror 7a is reflected off the reflection mirror 8a, passes through the field lens 10R, and is incident on an image formation area of the light modulator 4R for red light. The green light LG reflected off the first dichroic mirror 7a is further reflected off the second dichroic mirror 7b, passes through the field lens 10G, and is incident on an image formation area of the light modulator 4G for green light. The blue light LB having passed through the second dichroic mirror 7b travels via the relay lens 9a, the light-incident-side reflection mirror 8b, the relay lens 9b, the light-exiting-side reflection mirror 8c, and the field lens 10B and is incident on an image formation area of the light modulator 4B for blue light.

The light modulators 4R, 4G, and 4B each modulate the color light incident thereon in accordance with image information to form image light. The light modulators 4R, 4G, and 4B are each formed of a liquid crystal light valve. Although not shown, a light-incident-side polarizer is disposed on the light incident side of each of the light modulators 4R, 4G, and 4B. A light-exiting-side polarizer is disposed on the light exiting side of each of the light modulators 4R, 4G, and 4B.

The light combining system 5 combines the image light outputted from the light modulator 4R, the image light outputted from the light modulator 4G, and the image light outputted from the light modulator 4B with one another to form full-color image light. The light combining system 5 is formed of a cross dichroic prism that is formed of four right angled prisms bonded to each other and has a substantially square shape in a plan view. Dielectric multilayer films are formed along the substantially X-letter-shaped interfaces between the right angled prisms bonded to each other.

The image light having exited out of the light combining system 5 is enlarged and projected by the projection optical apparatus 6 to form an image on the screen SCR. That is, the projection optical apparatus 6 projects the light modulated by the light modulators 4R, 4G, and 4B. The projection optical apparatus 6 is formed of a plurality of projection lenses.

An example of the illuminator 2 according to the present embodiment will be described.

Figure 2:
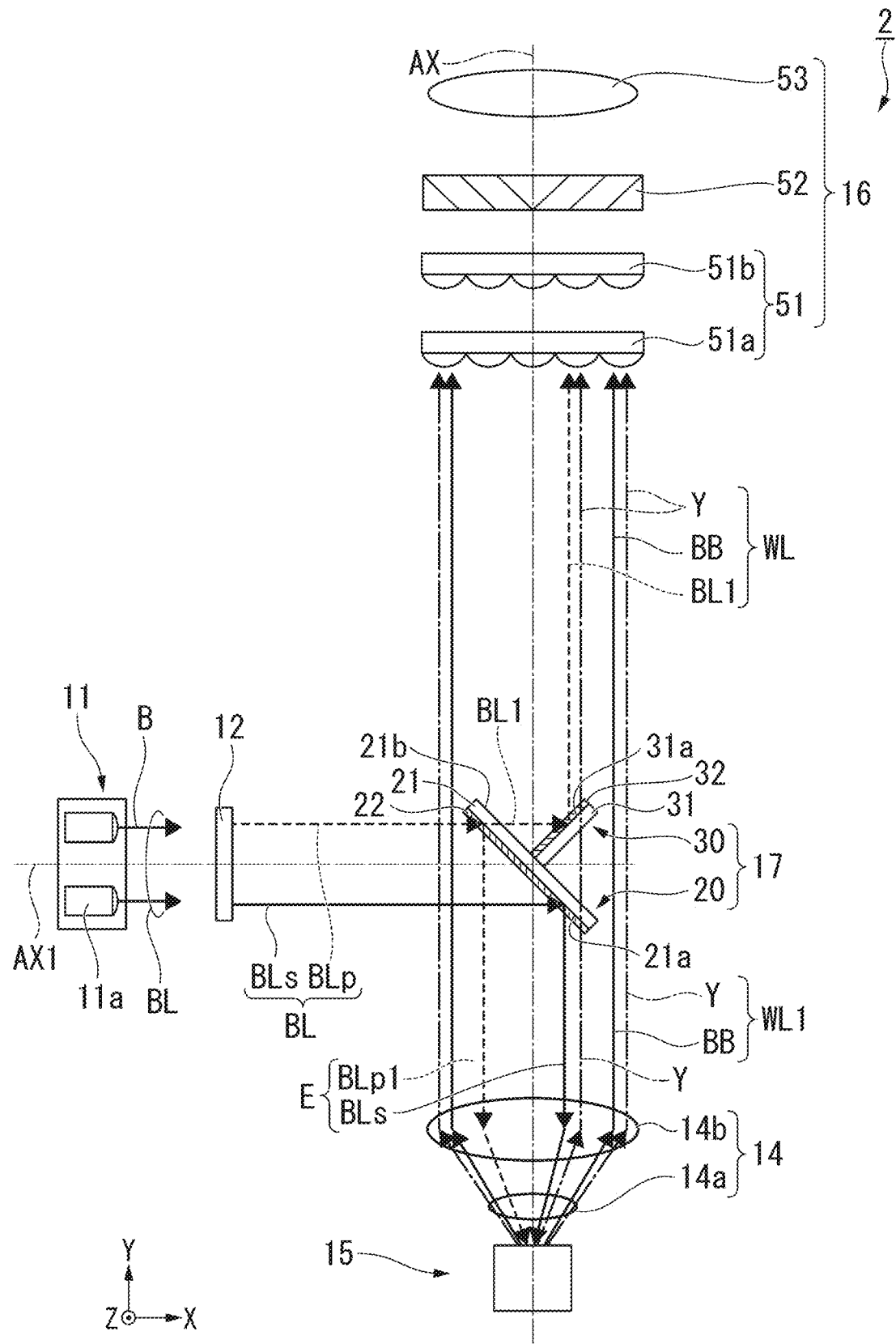
FIG. 2 is a schematic configuration diagram of an illuminator.

FIG. 2 shows a schematic configuration diagram of the illuminator 2.

The illuminator 2 according to the present embodiment includes a light source 11, a diffuser 12, a pickup system 14, a wavelength converter 15, a homogenized illumination system 16, and an optical member 17, as shown in FIG. 2.

In the following description, an XYZ orthogonal coordinate system is used, and the axes thereof are defined as follows: An axis X is an axis parallel to the chief ray of blue light BL outputted from the light source 11; an axis Y is an axis parallel to the chief ray of fluorescence Y emitted from the wavelength converter 15; and an axis Z is an axis perpendicular to the axes X and Y. In the present embodiment, an optical axis AX1 of the light source 11 is an axis extending along the axis X, and an illumination optical axis AX of the illuminator 2 is an axis extending along the axis Y. The optical axis of the wavelength converter 15 coincides with the illumination optical axis AX of the illuminator 2.

In the present embodiment, the light source 11, the diffuser 12, and the optical member 17 are arranged along the optical axis AX1. The wavelength converter 15, the pickup system 14, the optical member 17, and the homogenized illumination system 16 are arranged along the illumination optical axis AX.

The light source 11 includes a plurality of light emitters 11a. In the present embodiment, the light source 11 includes, for example, four light emitters 11a. The four light emitters 11a are arranged separately from each other in two rows and two columns along the axes Y and Z. The number and arrangement of the light emitters 11a, which form the light source 11, are not limited to a specific number and arrangement.

The light emitters 11a each include a blue semiconductor laser. The blue semiconductor laser outputs a blue luminous flux B having, for example, a first wavelength band having a peak wavelength that falls within a range from 380 to 495 nm. The light source 11 in the present embodiment therefore outputs four blue luminous fluxes B as a whole. In the present specification, the four blue luminous fluxes B are collectively referred to as the blue light BL, and the center axis of the entire four blue luminous fluxes B is referred to as the chief ray of blue light BL. As will be described later, part of the blue light BL functions as excitation light that excites a phosphor contained in the wavelength converter 15. The blue light BL in the present embodiment corresponds to the "first light" in the appended claims.

In the present embodiment, the light emitters 11a are each what is called a CAN-package-type laser device in the form of a package that accommodates one semiconductor laser chip. Further, the CAN-package-type laser device outputs the blue luminous flux B parallelized by a collimator lens formed of a convex lens provided at a light exiting surface. The light emitters 11a may instead be a light emitter in the form of a single package that accommodates a plurality of semiconductor laser chips.

The light emitters 11a each output linearly polarized light having a predetermined polarization direction as the blue luminous flux B. The polarization direction of the blue luminous flux B outputted by each of the light emitters 11a with respect to the optical member 17 changes in accordance with the orientation of the light emitter 11a incorporated in the light source 11.

In the light source 11 in the present embodiment, the light emitters 11a are each so incorporated that the proportion of the blue light BL incident as a P-polarized component on the optical member 17 is equal to the proportion of the blue light BL incident as an S-polarized component on the optical member 17.

The light source 11 in the present embodiment therefore outputs, as the blue light BL, linearly polarized light containing S-polarized light BLs and P-polarized light BLp with respect to the optical member 17 in equal proportions.

The diffuser 12 diffuses the blue light BL outputted from the light source 11 and causes the diffused blue light BL to exit toward the optical member 17.

In the illuminator 2 according to the present embodiment, the diffuser 12 lowers the peak value of the illuminance of the blue light BL on the wavelength converter 15. The diffuser 12 is, for example, a polished glass plate made of optical glass or a light transmissive substrate provided with a plurality of structural elements each having a lens shape.

The blue light BL having passed through the diffuser 12 is incident on the optical member 17. The optical member reflects part of the blue light BL having the first wavelength band and causes the reflected blue light BL to be incident as excitation light E on the wavelength converter 15.

The excitation light E enters the pickup system 14. The pickup system 14 includes convex lenses 14a and 14b, focuses the excitation light E, and causes the focused excitation light E to be incident on the wavelength converter 15.

Figure 3:
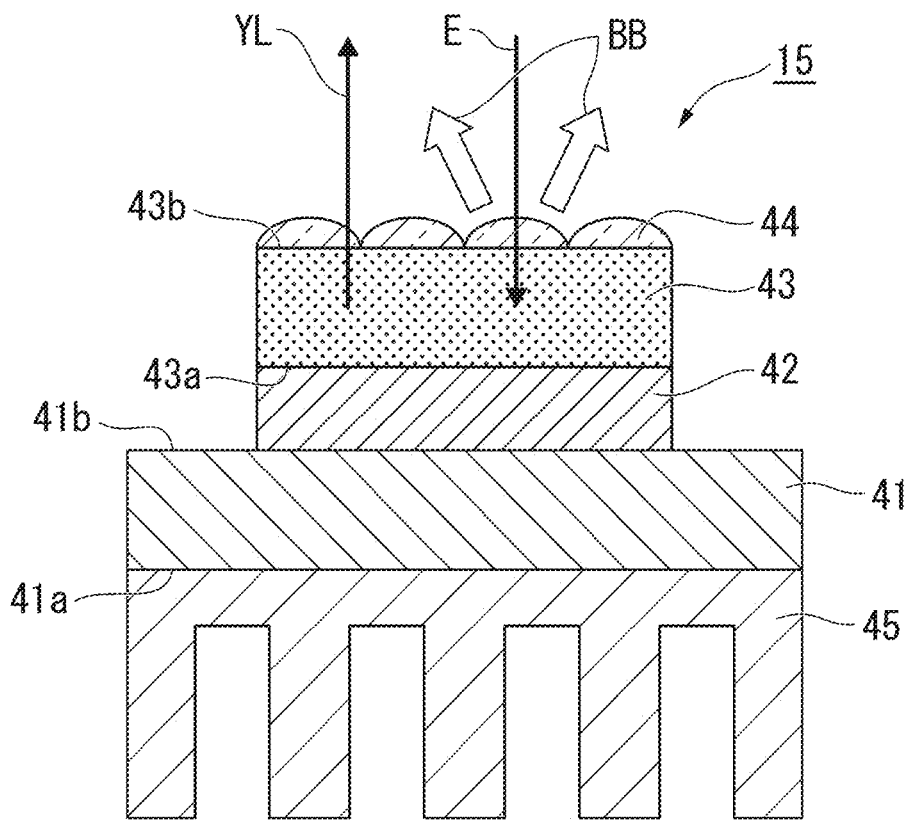
FIG. 3 is a cross-sectional view of a wavelength converter.

FIG. 3 is a cross-sectional view of the wavelength converter 15.

The wavelength converter 15 includes a substrate 41, a reflection layer 42, a wavelength conversion layer 43, a structural element 44, and a heat sink 45, as shown in FIG. 3. The wavelength converter 15 converts the excitation light E having exited out of the pickup system 14 into the fluorescence Y having a second wavelength band different from the first wavelength band.

The wavelength conversion layer 43 contains a ceramic phosphor that converts the excitation light E into the yellow fluorescence Y. The second wavelength band ranges, for example, from 490 to 750 nm, and the fluorescence Y is yellow light containing the green light component and the red light component. The phosphor may contain a monocrystalline phosphor. The wavelength converter 15 has a substantially square planar shape when viewed in the direction in which the excitation light E is incident (axis-Y direction). The fluorescence Y in the present embodiment corresponds to the second light in the appended claims.

The substrate 41 functions as a support substrate that supports the reflection layer 42, the wavelength conversion layer 43, and the structural element 44 and further functions as a heat dissipation substrate that dissipates heat generated in the wavelength conversion layer 43. The substrate 41 is made of a material having high thermal conductivity, such as metal and ceramic. The substrate 41 includes the heat sink 45 on a first surface 41a. The heat sink 45 has a plurality of fins and improves the heat dissipation capability of the substrate 41.

The reflection layer 42 is provided on a second surface 41b of the substrate 41. That is, the reflection layer 42 is located between the second surface 41b of the substrate 41 and a first surface 43a of the wavelength conversion layer 43 and reflects the fluorescence Y incident from the wavelength conversion layer 43 toward the wavelength conversion layer 43. The reflection layer 42 is formed, for example, of a laminated film including a dielectric multilayer film, a metal mirror, an enhanced reflection film, and other films.

The wavelength conversion layer 43 has the first surface 43a and a second surface 43b, which face away from each other. The first surface 43a of the wavelength conversion layer 43 is a surface facing the substrate 41. The second surface 43b of the wavelength conversion layer 43 is a light incident surface on which the excitation light E is incident and is also a surface that functions as a light exiting surface via which the fluorescence Y exits.

The wavelength conversion layer 43 contains, for example, an yttrium-aluminum-garnet-based (YAG-based) phosphor. Consider YAG:Ce, which contains cerium (Ce) as an activator, by way of example, and the YAG:Ce phosphor can be made, for example, of a material produced by mixing raw powder materials containing $Y_2O_3$, $Al_2O_3$, $CeO_3$, and other constituent elements with one another and causes the mixture to undergo a solid-phase reaction, Y—Al—O amorphous particles produced by using a coprecipitation method, a sol-gel method, or any other wet method, or YAG particles produced by using a spray-drying method, a flame-based thermal decomposition method, a thermal plasma method, or any other gas-phase method.

The structural element 44 is provided at the second surface 43b of the wavelength conversion layer 43. The structural element 44 scatters part of the excitation light E incident on the wavelength converter 15 and reflects the scattered excitation light E in the direction opposite the direction in which the excitation light E is incident. The structural element 44 is made of a light transmissive material and has a plurality of scattering structures. The scattering structures in the present embodiment each have a lens shape formed of a convex portion.

The structural element 44 is formed separately from the wavelength conversion layer 43. The structural element 44 in the present embodiment is suitably formed, for example, by forming a dielectric element in a vapor deposition method, a sputtering method, a CVD method, or a coating method and then processing the dielectric element in photolithography. The structural element 44 is desirably made of a chemically stable material that absorbs light only by a small amount. That is, the structural element 44 can be made of a material having a refractive index that falls within a range from 1.3 to 2.5, for example, $SiO_2$, SiON, or $TiO_2$. For example, the structural element 44 made of $SiO_2$ can be processed with high precision by using wet etching or dry etching.

According to the configuration described above, out of the excitation light E incident on the wavelength converter 15, part of the excitation light E passes through the structural element 44 and is then converted in terms of wavelength by the wavelength conversion layer 43 into the fluorescence Y. That is, part of the excitation light E functions as the excitation light that excites the phosphor. On the other hand, the other part of the excitation light is backscattered by the structural element 44 before converted in terms of wavelength into the fluorescence Y and exits out of the wavelength converter 15 without undergoing the wavelength conversion. In this process, the excitation light E exits in the form of diffused light having an angular distribution that is substantially the same as the angular distribution of the fluorescence Y. A component of the excitation light E that the component diffusively reflected off the structural element 44 is hereinafter referred to as blue diffused light BB.

In place of the structural element 44 described above, the wavelength conversion layer 43 may contain a scattering element that scatters the excitation light E and the fluorescence Y. The scattering element is, for example, a plurality of pores formed in the phosphor. In this case, out of the excitation light E incident on the wavelength converter 15, part of the excitation light E is converted in terms of wavelength into the fluorescence Y, whereas the other part of the excitation light E is backscattered by the scattering element contained in the phosphor before converted in terms of wavelength into the fluorescence Y and exits as the blue diffused light BB out of the wavelength converter 15 without undergoing the wavelength conversion.

According to the thus configured wavelength converter 15 in the present embodiment, light WL1, which contains the fluorescence Y generated by the wavelength conversion layer 43 and the blue diffused light BB diffusively reflected off the structural element 44 provided at the second surface 33*b* of the wavelength conversion layer 43, exits toward the pickup system 14. The light WL1 is substantially parallelized by the pickup system 14 and incident on the optical member 17 disposed in the illumination optical axis AX.

The configuration of the optical member 17 will subsequently be described.

The optical member 17 includes a first optical element 20 and a second optical element 30, as shown in FIG. 2.

The first optical element 20 reflects part of the blue light BL to cause the reflected blue light BL to be incident on the wavelength converter 15 and transmits the other part of the blue light BL and the fluorescence Y emitted from the wavelength converter 15. The second optical element 30 reflects the other part of the blue light BL having passed through the first optical element 20, the direction of the reflected light being the traveling direction of the fluorescence Y having passed through the first optical element 20, and transmits the fluorescence Y emitted from the wavelength converter 15.

The optical element 20 is so disposed as to incline by 45 degrees with respect to the optical axis AX1 and the illumination optical axis AX.

The first optical element 20 includes a light transmissive substrate 21 and a first dichroic mirror 22. The light transmissive substrate 21 is a substrate having optical transparency that allows light transmission and is formed, for example, of a transparent substrate.

The first dichroic mirror 22 is formed of a dielectric multilayer film provided at a first surface 21*a* of the light transmissive substrate 21. The first dichroic mirror 22 reflects part of the blue light BL outputted from the light source 11 and transmits the other part of the blue light BL and the fluorescence Y emitted from the wavelength converter 15. The first surface 21*a* of the light transmissive substrate 21 faces the light source 11. The first surface 21*a* of the light transmissive substrate 21 also faces the diffuser 12. The first surface 21*a* of the light transmissive substrate 21 still further faces the wavelength converter 15.

The optical element 30 is so disposed as to incline by 45 degrees with respect to the optical axis AX1 and the illumination optical axis AX.

The second optical element 30 is provided at a second surface 21*b* of the first optical element 20, which is the opposite surface from the first surface 21*a* of the light transmissive substrate 21. The second surface 21*b* of the light transmissive substrate 21 faces the homogenized illumination system 16, which will be described later. More specifically, the second surface 21*b* of the light transmissive substrate 21 faces a first multi-lens array 51*a*, which will be described later.

The second optical element 30 is so disposed as to incline by an angle of 90 degrees with respect to the second surface 21*b* of the light transmissive substrate 21.

In the present embodiment, in the plan view of the first optical element 20 viewed along the optical axis of the wavelength converter 15 (illumination optical axis AX), specifically, in the plan view of the first optical element 20 viewed toward the side +Y, the second optical element 30 is so disposed as to be hidden behind the second surface 21*b*, which is the rear surface of the first optical element 20. The plan view of the first optical element 20 viewed toward the side +Y is hereinafter simply referred to as "the plane view of the first optical element 20 viewed in the direction Y".

In the plan view of the first optical element 20 viewed in the direction Y, the second optical element 30 is so disposed as to be hidden behind the rear surface of the first optical element 20 so that the second optical element 30 is not visually recognized.

Further, in the present embodiment, in the plan view of the first optical element 20 viewed along the optical axis AX1 of the light source 11, that is, in the plan view of the first optical element 20 viewed in the direction +X, the second optical element 30 is so disposed as to be hidden behind the second surface 21*b*, which is the rear surface of the first optical element 20. The plan view of the first optical element 20 viewed toward the side +X is hereinafter simply referred to as "the plane view of the first optical element 20 viewed in the direction X".

In the plan view of the first optical element 20 viewed in the direction X, the second optical element 30 is so disposed as to be hidden behind the rear surface of the first optical element 20 so that the second optical element 30 is not visually recognized.

The second optical element 30 includes a light transmissive substrate 31 and a second dichroic mirror 32. The light transmissive substrate 31 is a substrate having optical transparency that allows light transmission and is formed, for example, of a transparent substrate.

The second dichroic mirror 32 is formed of a dielectric multilayer film provided at a first surface 31*a* of the light transmissive substrate 31. The second dichroic mirror 32 reflects, in the direction +Y, which is the traveling direction of the fluorescence Y having passed through the first optical element 20, the other part of the blue light BL having passed through the first optical element 20 and transmits the fluorescence Y emitted from the wavelength converter 15.

In the present embodiment, the second optical element 30 is so provided as to be in contact with the first optical element 20. Specifically, the light transmissive substrate 31 of the second optical element 30 is so provided as to extend in the direction of a normal to the second surface 21*b* of the light transmissive substrate 21 of the first optical element 20. The second optical element 30 is bonded to the first optical element 20 via an optical adhesive (not shown).

In the present embodiment, the blue light BL outputted from the light source 11 is light containing the S-polarized light BLs and the P-polarized light BLp with respect to the optical member 17 in equal proportions. That is, the blue light BL is light containing the S-polarized light BLs and the P-polarized light BLp with respect to the first dichroic mirror 22 and the second dichroic mirror 32.

In the present embodiment, the S-polarized light BLs corresponds to the "light formed of a first polarized component polarized in a first direction" in the appended claims, and the P-polarized light BLp corresponds to the "light formed of a second polarized component polarized in a second direction" in the appended claims.

Figure 4A:
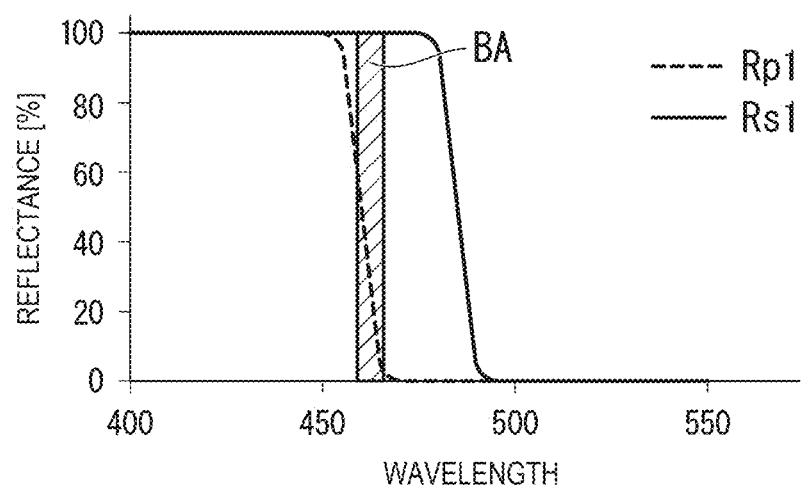
FIG. 4A shows an example of the optical characteristics of a first dichroic mirror.

FIG. 4A shows an example of the optical characteristics of the first dichroic mirror 22. In FIG. 4A, the line labeled with reference character Rs1 represents the reflectance of the light incident as S-polarized light on the first dichroic mirror 22, and the line labeled with reference character Rp1 represents the reflectance of the light incident as P-polarized light on the first dichroic mirror 22. In FIG. 4A, the horizontal axis represents the wavelength, and the vertical axis represents the reflectance. In FIG. 4A, the wavelength band of the blue light BL outputted from the light source 11 is labeled with reference character BA.

The first dichroic mirror 22 is characterized in that the reflectance of the S-polarized light of the blue light BL having the wavelength band labeled with reference character BA shown in FIG. 4A is greater than the reflectance of the P-polarized light of the blue light BL. The first dichroic mirror 22 is so optically characterized as to transmit the fluorescence Y emitted from the wavelength converter 15. The first dichroic mirror 22 is so characterized as to reflect the S-polarized light BLs of the blue light BL and transmit at least part of the P-polarized light BLp of the blue light BL. The first dichroic mirror 22 may instead transmit the entire P-polarized light BLp of the blue light BL.

The first optical element 20 in the present embodiment, which includes the first dichroic mirror 22 having the optical characteristics described above, can reflect the S-polarized light BLs, which is part of the blue light BL, toward the wavelength converter 15 and transmit part of the P-polarized light BLp, which is the other part of the blue light BL, and the fluorescence Y, as shown in FIG. 2. P-polarized light BLp1, which is part of the P-polarized light BLp, is reflected off the first dichroic mirror 22 toward the wavelength converter 15.

As described above, the first optical element 20 in the present embodiment causes the S-polarized light BLs and the P-polarized light BLp1, which are part of the blue light BL outputted from the light source 11, to exit as the excitation light E toward the wavelength converter 15. In the present embodiment, the excitation light E corresponds to "part of the first light" in the appended claims.

On the other hand, part of the P-polarized light BLp having passed through the first optical element 20 is incident on the second optical element 30. Part of the P-polarized light BLp having passed through the first optical element 20 is hereinafter referred to as passing blue light BL1. In the present embodiment, the passing blue light BL1 corresponds to "another part of the first light" in the appended claims.

Figure 4B:
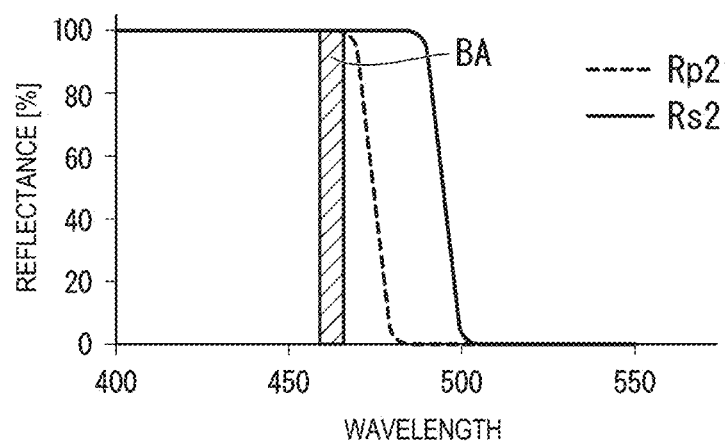
FIG. 4B shows an example of the optical characteristics of a second dichroic mirror.

FIG. 4B shows an example of the optical characteristics of the second dichroic mirror 32. In FIG. 4B, the line labeled with reference character Rs2 represents the reflectance of the light incident as S-polarized light on the second dichroic mirror 32, and the line labeled with reference character Rp2 represents the reflectance of the light incident as P-polarized light on the second dichroic mirror 32. In FIG. 4B, the horizontal axis represents the wavelength, and the vertical axis represents the reflectance. In FIG. 4B, the wavelength band of the blue light BL outputted from the light source 11 is labeled with reference character BA.

The optical characteristics of the first dichroic mirror 22 differ from those of the second dichroic mirror 32, as shown in FIGS. 4A and 4B.

Specifically, the second dichroic mirror 32 is so optically characterized as to reflect the S-polarized light BLs and the P-polarized light BLp of the blue light BL having the wavelength band labeled with reference character BA shown in FIG. 4B. The second dichroic mirror 32 is so optically characterized as to transmit the fluorescence Y emitted from the wavelength converter 15, as the first dichroic mirror 22.

The second optical element 30 in the present embodiment, which includes the second dichroic mirror 32 having the optical characteristics described above, can transmit the fluorescence Y emitted from the wavelength converter 15 in the direction +Y and reflect the passing blue light BL1 having passed through the first optical element 20 in the direction +Y, which is the traveling direction of the fluorescence Y having passed through the first optical element 20, as shown in FIG. 2.

The above description using FIGS. 4A and 4B has been made with reference to the ideal state in which the blue light BL is incident as a parallel luminous flux on the optical member 17. In the illuminator 2 according to the present embodiment, however, the blue light BL outputted from the light source 11 is diffused by the diffuser 12, that is, the blue light BL has an angular distribution and is not incident as a parallel luminous flux on the optical member 17.

A dichroic mirror formed by laminating a plurality of dielectric films typically has light incident angle dependence that causes the reflectance of light incident on the dichroic mirror to vary in accordance with the angle of incidence of the light. The first dichroic mirror 22 and the second dichroic mirror 32 therefore each have light incident angle dependence that causes the reflectance to change in accordance with the angle of incidence of the blue light BL.

It is therefore desirable in the design of the first dichroic mirror 22 and the second dichroic mirror 32 to consider the light incident angle dependence. A description will be made of an example of the design of the first dichroic mirror 22 and the second dichroic mirror 32 with the light incident angle dependence taken into consideration.

Figure 5:
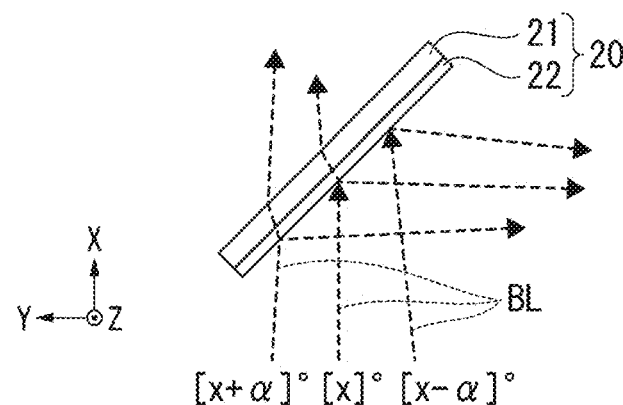
FIG. 5 shows a state in which blue light having an angular distribution is incident.

FIG. 5 shows a state in which the blue light BL having an angular distribution is incident on the first dichroic mirror 22. FIG. 5 shows a state in which the blue light BL is incident on the first dichroic mirror 22 at angles of incidence X, X+α, and X−α. In FIG. 5, the angle of incidence X of the blue light BL is set, for example, at 45 degrees.

The blue light BL in the present embodiment is diffused by the diffuser 12, and the blue light BL having a predetermined angular distribution (X±α degrees) is incident on the first optical element 20, as shown in FIG. 5.

Figure 6A:
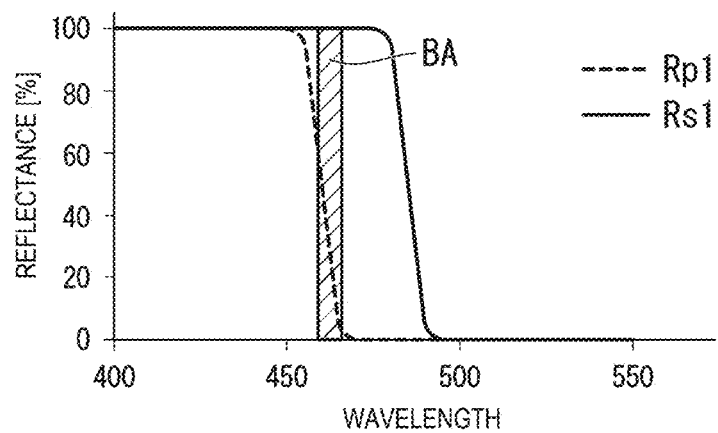
FIG. 6A are graphs showing the angular dependence of the first dichroic mirror.
Figure 6B:
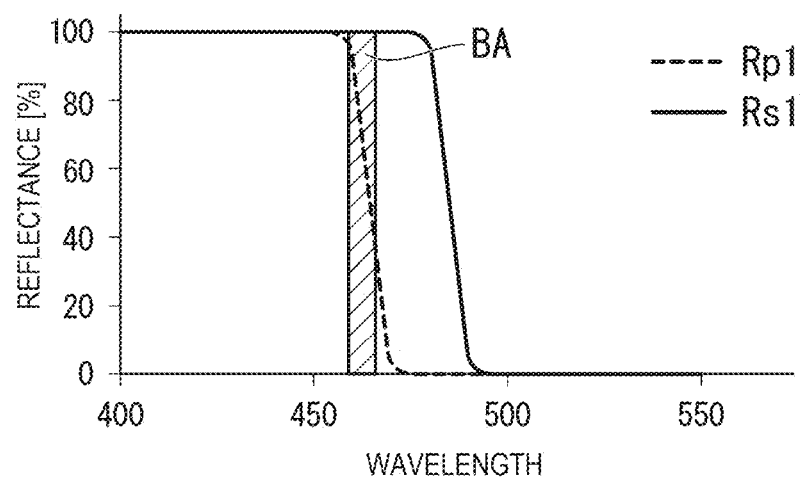
FIG. 6B are graphs showing the angular dependence of the first dichroic mirror.
Figure 6C:
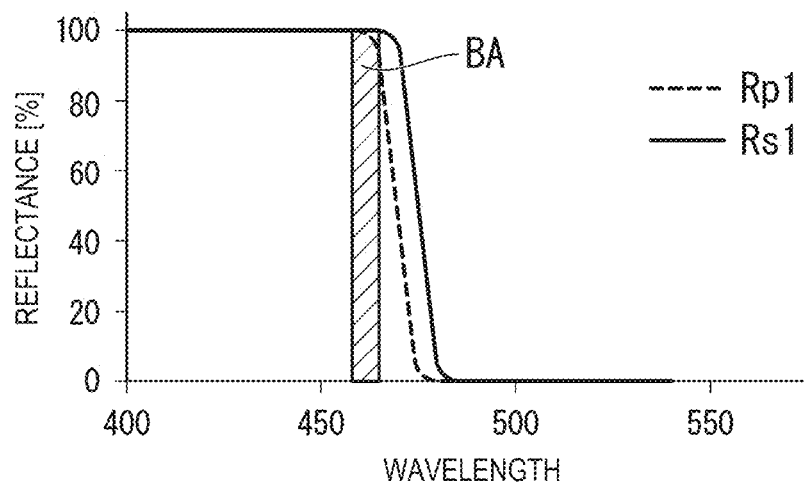
FIG. 6C are graphs showing the angular dependence of the first dichroic mirror.

FIGS. 6A, 6B, and 6C are graphs showing the angular dependence of the first dichroic mirror 22. In FIGS. 6A, 6B and 6C, the horizontal axis represents the wavelength of the incident light, and the vertical axis represents the reflectance. FIGS. 6A, 6B, and 6C show the reflectance characteristics of the first dichroic mirror 22 that reflects the light incident at the angles of incidence X+α, X, and X−α. The wavelength band of blue light BL is labeled with reference character BA in FIGS. 6A, 6B, and 6C.

The reflectance of the P-polarized light BLp reflected off the first dichroic mirror 22 changes in accordance with the angle of incidence of the blue light BL, as shown in FIGS. 6A, 6B, and 6C. The reflectance of the P-polarized light BLp reflected off the first dichroic mirror 22 decreases as the angle of incidence of the blue light BL increases. On the other hand, the reflectance of the S-polarized light BLs reflected off the first dichroic mirror 22 does not change irrespective of the angle of incidence of the blue light BL.

The first dichroic mirror 22 having the angular distribution shown in FIGS. 6A, 6B, and 6C reflects the entire P-polarized light BLp incident at the angle of incidence (X−α) degrees and transmits part of the P-polarized light BLp incident at the angle of incidence X degrees. The first dichroic mirror 22 transmits the P-polarized light BLp incident at the angle of incidence (X+α) degrees by a greater amount than the P-polarized light BLp incident at the other angles of incidence.

Considering the angular dependence of the first dichroic mirror 22, the P-polarized light BLp having passed through the first optical element 20 and incident on the second dichroic mirror 32 of the second optical element 30 is believed to be the light incident on the first dichroic mirror 22 at large angles of incidence (at least X degrees, for example).

Therefore, when considering the angular dependence of the first dichroic mirror 22, the second dichroic mirror 32 may be designed as a film having optical characteristics that allow efficient reflection of the P-polarized light BLp incident at large angles of incidence.

When considering the angular dependence, it is desirable that the first dichroic mirror 22 and the second dichroic mirror 32 are formed of films designed differently from each other. That is, the second dichroic mirror 32 may be formed of a film having characteristics more specialized in the reflection of the P-polarized light BLp than the first dichroic mirror 22.

Further, when considering the angular dependence, the second dichroic mirror 32 may be produced by using the same film as the film that forms the first dichroic mirror 22. In this case, the angle of incidence of the P-polarized light BLp incident on the second dichroic mirror 32 may be so set that the reflectance of the light reflected off the second dichroic mirror 32 increases by adjustment of the angle at which the second optical element 30 is attached to the first optical element 20.

Referring back to FIG. 2, in the illuminator 2 according to the present embodiment, a central luminous flux of the light WL1 emitted from the wavelength converter 15 is incident on the optical member 17, and a peripheral luminous flux of the light WL1 is not incident on the optical member 17 but passes through the space outside the optical member 17.

Out of the light WL1 emitted from the wavelength converter 15, the blue diffused light BB incident on the optical member 17 is reflected off the first optical element 20 of the optical member 17 and therefore lost, but the blue diffused light BB that is not incident on the optical member 17 enters as the illumination light along with the fluorescence Y the homogenized illumination system 16.

In the illuminator 2 according to the present embodiment, the passing blue light BL1, which is part of the blue light BL having passed through the first optical element 20 of the optical member 17, is reflected off the second optical element 30 in the traveling direction of the fluorescence Y, so that the reflected passing blue light BL1 can be extracted as the illumination light out of the illuminator 2.

In the illuminator 2 according to the present embodiment, the blue diffused light BB and the fluorescence Y contained in the light WL1 having passed through the area where the optical member 17 is not provided, the fluorescence Y having passed through the optical member 17, and the passing blue light BL1 reflected off the optical member 17 in the exiting direction of the fluoresce Y can be combined with one another into white illumination light WL that can be outputted. The illumination light WL enters the homogenized illumination system 16.

The homogenized illumination system 16, which the illumination light WL enters, includes an optical integration system 51, a polarization converter 52, and a superimposing system 53. The optical integration system 51 includes the first multi-lens array 51a and a second multi-lens array 51b.

The polarization converter 52 has a configuration in which polarization separation films and retardation films are arranged in an array. The polarization converter 52 aligns the polarization directions of the illumination light WL with a predetermined direction. Specifically, the polarization converter 52 aligns the polarization directions of the illumination light WL with the direction of the transmission axis of the light-incident-side polarizers for the light modulators 4R, 4G, and 4B.

The polarization directions of the red light LR, the green light LG, and the blue light LB separated from the illumination light WL having passed through the polarization converter 52 thus coincide with the direction of the transmission axis of the light-incident-side polarizers for the light modulators 4R, 4G, and 4B. The red light LR, the green light LG, and the blue light LB are therefore incident on the image formation areas of the light modulators 4R, 4G, and 4B, respectively, without being blocked by the light-incident-side polarizers.

The superimposing system 53 along with the second multi-lens array 51b brings images of lenslets of the first multi-lens array 51a into focus in the vicinity of the image formation area of each of the light modulators 4R, 4G, and 4B. That is, the superimposing system 53, in cooperation with the optical integration system 51, homogenizes the illuminance distribution in the image formation area of each of the light modulators 4R, 4G, and 4B, which are illumination receiving areas.

To verify the effect of the optical member 17, the present inventor has performed a simulation on the illuminance distribution of blue light contained in the illumination light WL at the time when the illumination light WL enters the homogenized illumination system 16.

Figure 7A:
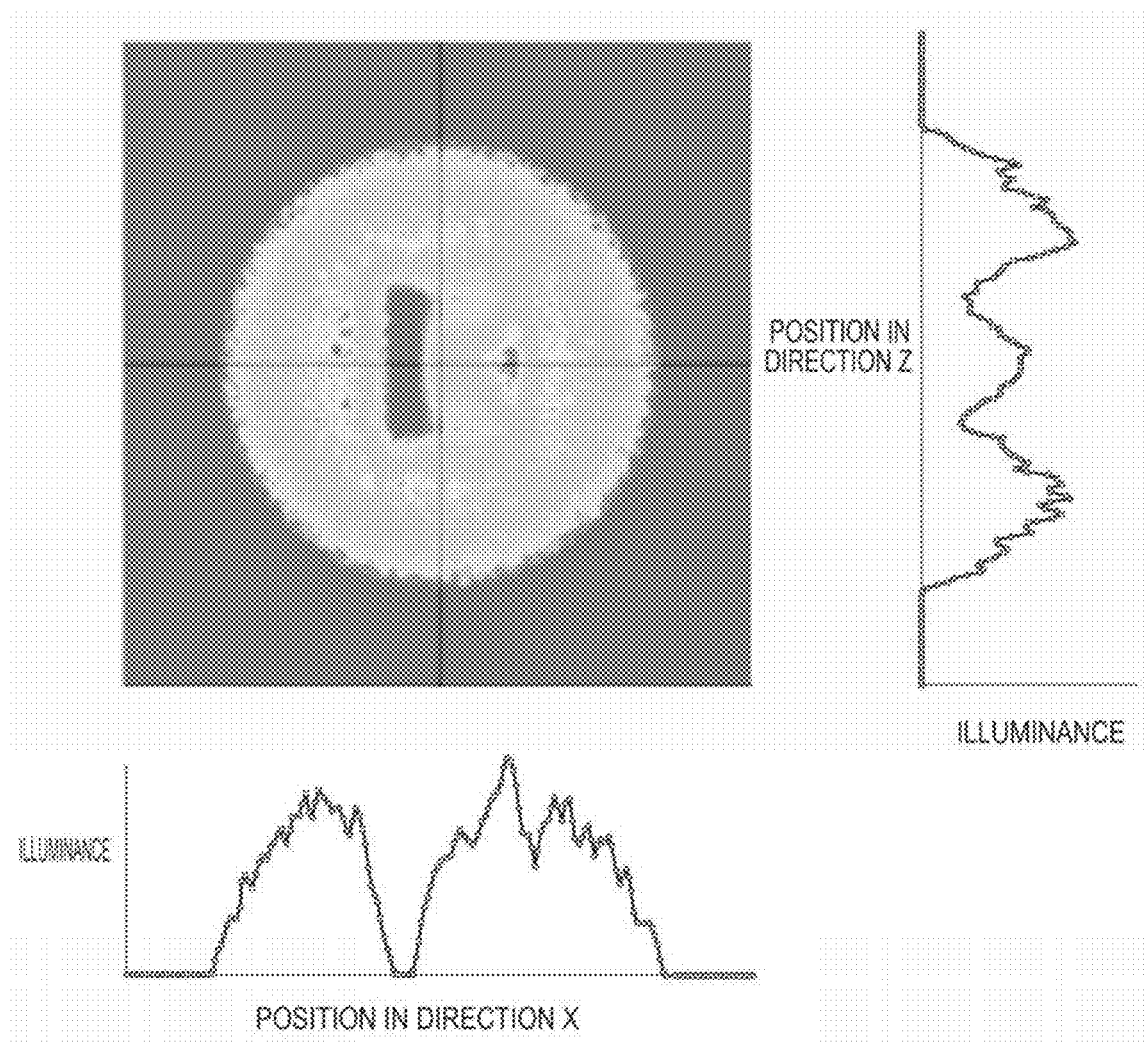
FIG. 7A is the result of a simulation showing the illuminance distribution of blue light.

FIG. 7A shows the results of the simulation that illustrate the illuminance distribution of the blue light contained in the illumination light WL at the time when the illumination light WL enters the homogenized illumination system 16. The lower portion of FIG. 7A shows a graph of the illuminance distribution of the blue light in the direction X, and the right portion of FIG. 7A shows a graph of the illuminance distribution of blue light in the direction Z.

Figure 7B:
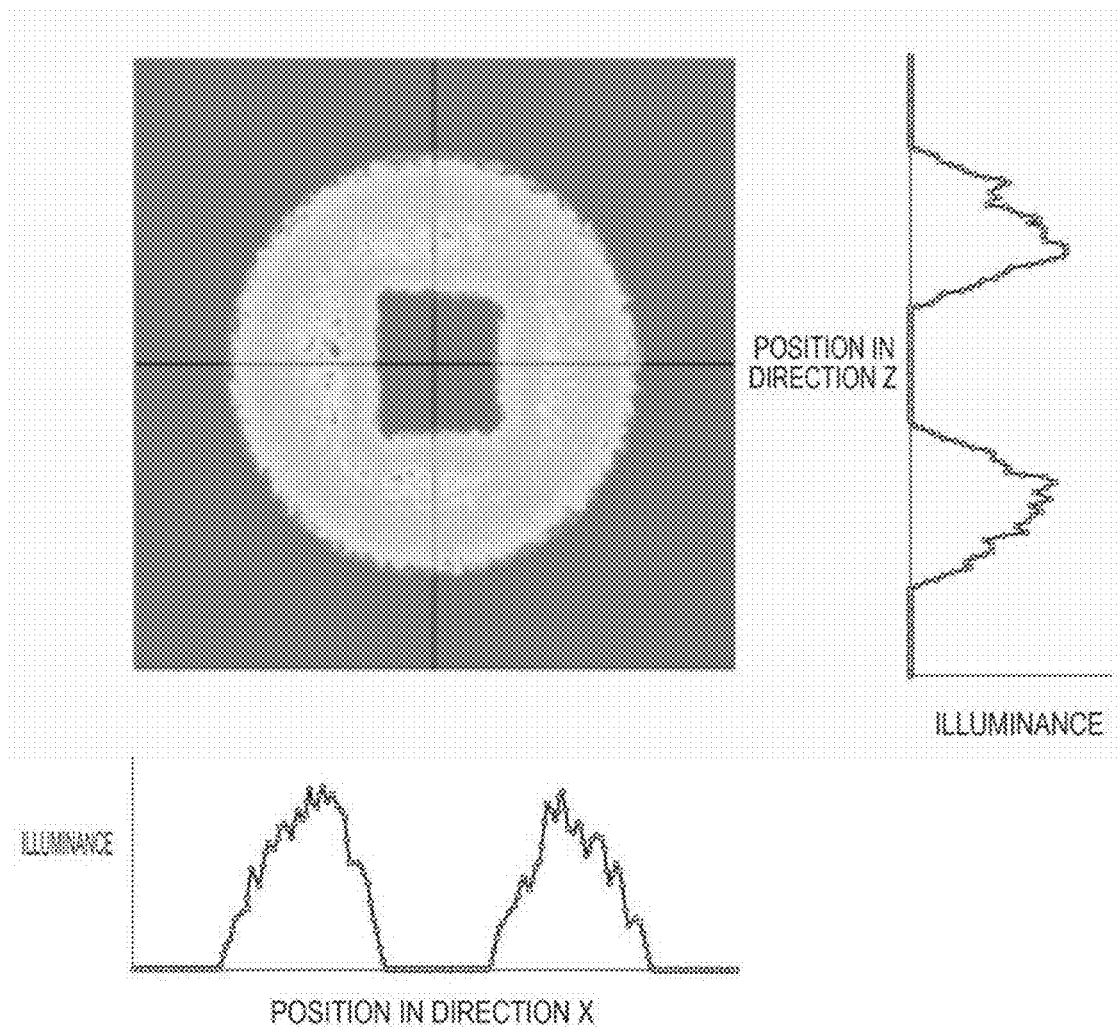
FIG. 7B is the result of the simulation showing the illuminance distribution in Comparative Example.

As Comparable Example, consider a case where the optical member 17 is formed only of the first optical element 20. FIG. 7B is the results of the simulation that show the illuminance distribution of the illumination light in Comparable Example.

In the configuration of Comparable Example, the P-polarized light contained in the blue light BL undesirably passes through the first optical element 20, resulting in a loss of the blue light of the illumination light. Further, in the configuration of Comparable Example, the blue diffused light BB emitted from the wavelength converter 15 is reflected off the first optical element 20 and therefore lost, undesirably resulting in a loss of the blue light of the illumination light. The configuration of Comparable Example therefore provides an illuminance distribution in which the illuminance in a central portion of the blue light is lost, as shown in FIG. 7B.

In contrast, in the illuminator 2 according to the present embodiment, the passing blue light BL1 having passed through the first optical element 20 is reflected off the second optical element 30 in the optical member 17 in the traveling direction of the fluorescence Y and can be used as the illumination light WL. The illuminator 2 according to the present embodiment can therefore provide an illuminance distribution in which the illuminance in the central portion of the blue light is compensated by the illuminance of the passing blue light BL1, as shown in FIG. 7A.

It has been ascertained that the illuminator 2 according to the present embodiment can reduce the loss of blue light in the illumination light WL as compared with the loss produced in the configuration of Comparable Example.

Effects of First Embodiment

The illuminator 2 according to the present embodiment includes the light source 11, which outputs the blue light BL, the wavelength converter 15, which converts the blue light BL into the fluorescence Y, the first optical element 20, which reflects part of the blue light BL to cause the reflected blue light BL to be incident on the wavelength converter 15 and transmits the other part of the blue light BL and the fluorescence Y emitted from the wavelength converter 15, and the second optical element 30, which reflects the other part of the blue light BL having passed through the first optical element 20, the direction of the reflected light being the traveling direction of the fluorescence Y having passed through the first optical element 20, and transmits the fluorescence Y emitted from the wavelength converter 15.

The illuminator 2 having the configuration described above, in which the passing blue light BL1, which is part of the blue light BL having passed through the first optical element 20, is reflected off the second optical element 30 in the traveling direction of the fluorescence Y, can use the passing blue light BL1 as the illumination light WL. The loss of the blue light BL outputted from the light source 11 can therefore be reduced, whereby bright illumination light WL can be generated.

In the illuminator 2 according to the present embodiment, the first optical element 20 may be configured to reflect the S-polarized light BLs of the blue light BL and transmit at least part of the P-polarized light BLp of the blue light BL.

According to the configuration described above, the blue light BL outputted from the light source 11 can be separated into the passing blue light BL1 and the excitation light E. The blue light BL outputted from the light source 11 can therefore be efficiently used.

In the illuminator 2 according to the present embodiment, in the plan view of the first optical element 20 viewed along the optical axis of the wavelength converter 15 (illumination optical axis AX), the second optical element 30 may be so disposed as to be hidden behind the rear surface of the first optical element 20.

The configuration described above, in which the second optical element 30 is hidden behind the rear surface of the first optical element 20 in the direction along the illumination optical axis AX, can suppress the optical loss that occurs when the second optical element 30 protruding from the first optical element 20 reflects the blue diffused light BB emitted from the wavelength converter 15.

In the illuminator 2 according to the present embodiment, in the plan view of the first optical element 20 viewed along the optical axis AX1 of the light source 11, the second optical element 30 may be so disposed as to be hidden behind the rear surface of the first optical element 20.

The configuration described above, in which the second optical element 30 is hidden behind the rear surface of the first optical element 20 in the direction along the optical axis AX1 of the light source 11, can prevent the second optical element 30 from directly reflecting the blue light BL outputted from the light source 11 when the second optical element 30 protrudes from the first optical element 20. The luminous flux width of the blue light BL incident on the first optical element 20 can be reduced, whereby the size of the light source 11 can be reduced.

In the illuminator 2 according to the present embodiment, the wavelength converter 15 may include the wavelength conversion layer 43, which converts the blue light BL into the fluorescence Y, the reflection layer 42, which is provided at the first surface 43a of the wavelength conversion layer 43, and the structural element 44, which is provided at the second surface 43b of the wavelength conversion layer 43.

According to the configuration described above, in which the structural element 44 is provided, part of the excitation light E incident on the wavelength converter 15 can be backscattered, and the blue diffused Light BB so diffused as to have an angular distribution substantially the same as the angular distribution of the fluorescence Y can be emitted.

The projector 1 according to the present embodiment includes the illuminator 2, the light modulators 4R, 4G, and 4B, which modulate the light from the illuminator 2 in accordance with image information, and the projection optical apparatus 6, which projects the light modulated by the light modulators 4R, 4G, and 4B.

The projector 1 according to the present embodiment, which includes the illuminator 2, which reduces optical loss and outputs bright illumination light, can be a projector that operates with high optical efficiency and displays a bright image.

Second Embodiment

A second embodiment of the present disclosure will be described below with reference to the drawings.

The configuration of a projector according to the second embodiment is the same as that in the first embodiment but the configuration of part of the illuminator differs therefrom. The overall configuration of the projector and the common configuration of the illuminator will therefore not be described. The members and configurations common to those in the first embodiment have the same reference characters.

Figure 8:
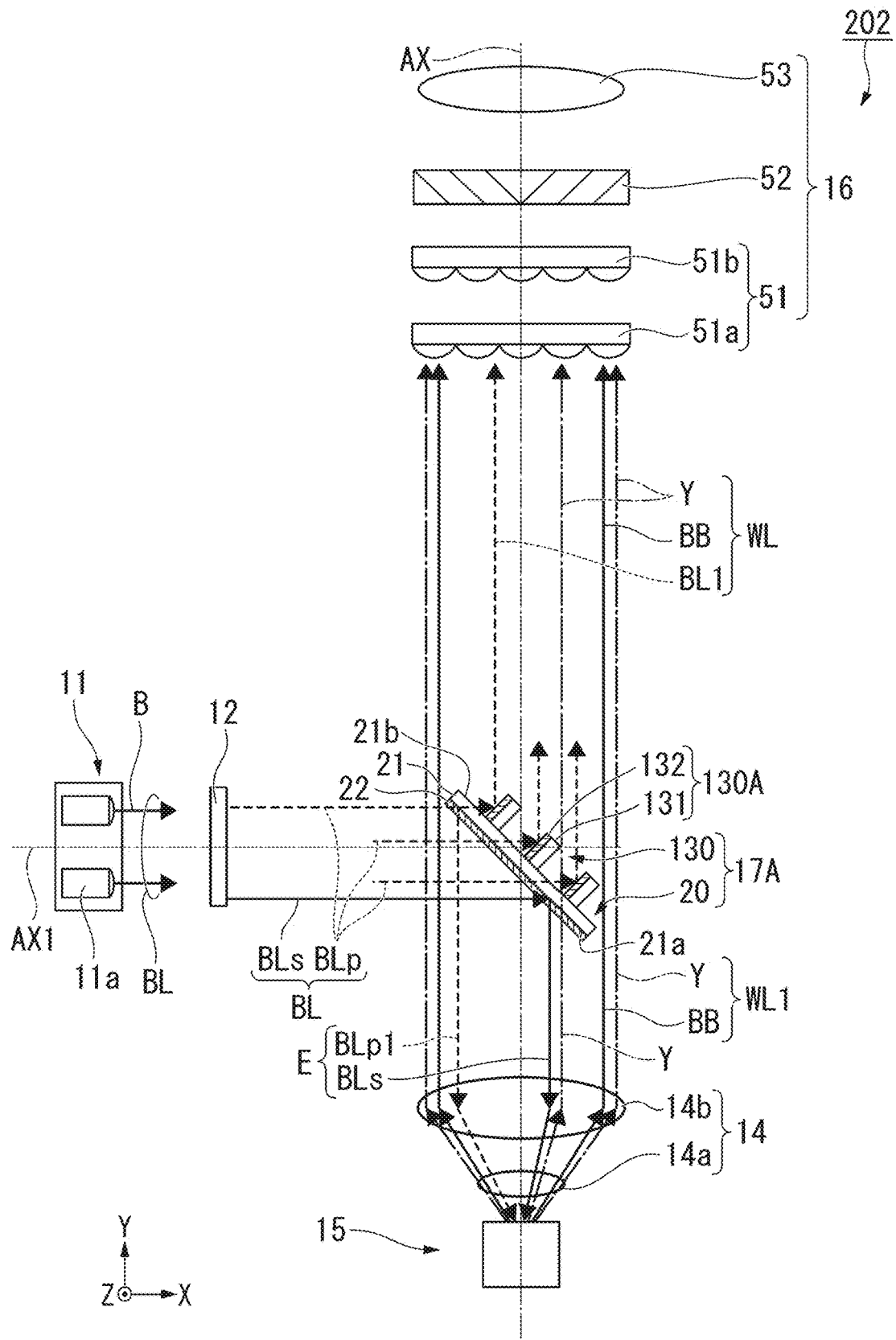
FIG. 8 is a schematic configuration diagram of an illuminator according to a second embodiment.

FIG. 8 is a schematic configuration diagram of an illuminator 202 according to the present embodiment.

The illuminator 202 according to the present embodiment includes the light source 11, the diffuser 12, the pickup system 14, the wavelength converter 15, the homogenized illumination system 16, and an optical member 17A, as shown in FIG. 8.

The optical member 17A in the present embodiment includes the first optical element 20 and a second optical element 130. The second optical element 130 in the present embodiment includes a plurality of reflectors 130A. In the present embodiment, the optical member 17A includes three reflectors 130A, but the number of reflectors 130A is not limited to three.

The reflectors 130A each include a light transmissive substrate 131 and a second dichroic mirror 132. The light transmissive substrate 131 and the second dichroic mirror 132 differ only in size from the light transmissive substrate 31 and the second dichroic mirror 32 of the second optical element 30. The light transmissive substrate 131 of each of the reflectors 130A is so provided as to extend in the direction of a normal to the second surface 21b of the light transmissive substrate 21 of the first optical element 20. The reflectors 130A are each bonded to the first optical element 20 with an optical adhesive (not shown). In the present embodiment, in the plan view of the first optical element 20 viewed in the direction X or Y, the reflectors 130A are each so provided as to be hidden behind the rear surface of the first optical element 20.

The reflectors 130A are so provided as to be in contact with the first optical element 20 and arranged in one direction. The reflectors 130A are arranged along the second surface 21b of the light transmissive substrate 21 of the first optical element 20.

The reflectors 130A are disposed in different positions in the direction Y perpendicular to (intersecting) the optical axis AX1 of the light source 11. Further, the reflectors 130A are disposed in different positions in the direction X along the optical axis AX1 of the light source 11. That is, the reflectors 130A are so arranged along the second surface 21b of the light transmissive substrate 21 as to be differ from one another in terms of arrangement positions in the directions X and Y. The reflectors 130A are so arranged along the second surface 21b of the light transmissive substrate 21 as to be separate from each other in the directions X and Y. The direction X along the optical axis AX1 corresponds to the "third direction" in the appended claims, and the direction Y perpendicular to the optical axis AX1 corresponds to the "fourth direction" in the appended claims.

The arrangement in which the reflectors 130A are disposed in different positions prevents the passing blue light BL1 reflected off each of the reflectors 130A from being incident on the other adjacent reflectors 130A. The second optical element 130 therefore allows the passing blue light BL1 across the entire width in the direction Y to be reflected in the traveling direction of the fluorescence Y and extract the reflected passing blue light BL1 as the illumination light.

Effects of Second Embodiment

In the illuminator 202 according to the present embodiment, the second optical element 130 includes a plurality of reflectors 130A, which are in contact with the first optical element 20. The plurality of reflectors 130A are disposed in different positions in the direction X along the optical axis AX1 of the light source 11 and in the direction Y which intersects the optical axis AX1 of the light source 11.

In the illuminator 202 according to the present embodiment, the passing blue light BL1, which has passed through the first optical element 20, across the entire width along the Y axis can be reflected off the plurality of reflectors 130A in the traveling direction of the fluorescence Y. The amount of passing blue light BL1 usable as the illumination light WL can therefore be increased. The light utilization efficiency of the blue light BL outputted from the light source 11 can be further improved.

Third Embodiment

A third embodiment of the present disclosure will be described below with reference to the drawings.

The configuration of a projector according to the third embodiment is the same as that in the first embodiment but the configuration of part of the illuminator differs therefrom. The overall configuration of the projector and the common configuration of the illuminator will therefore not be described. The members and configurations common to those in the first embodiment have the same reference characters.

Figure 9:
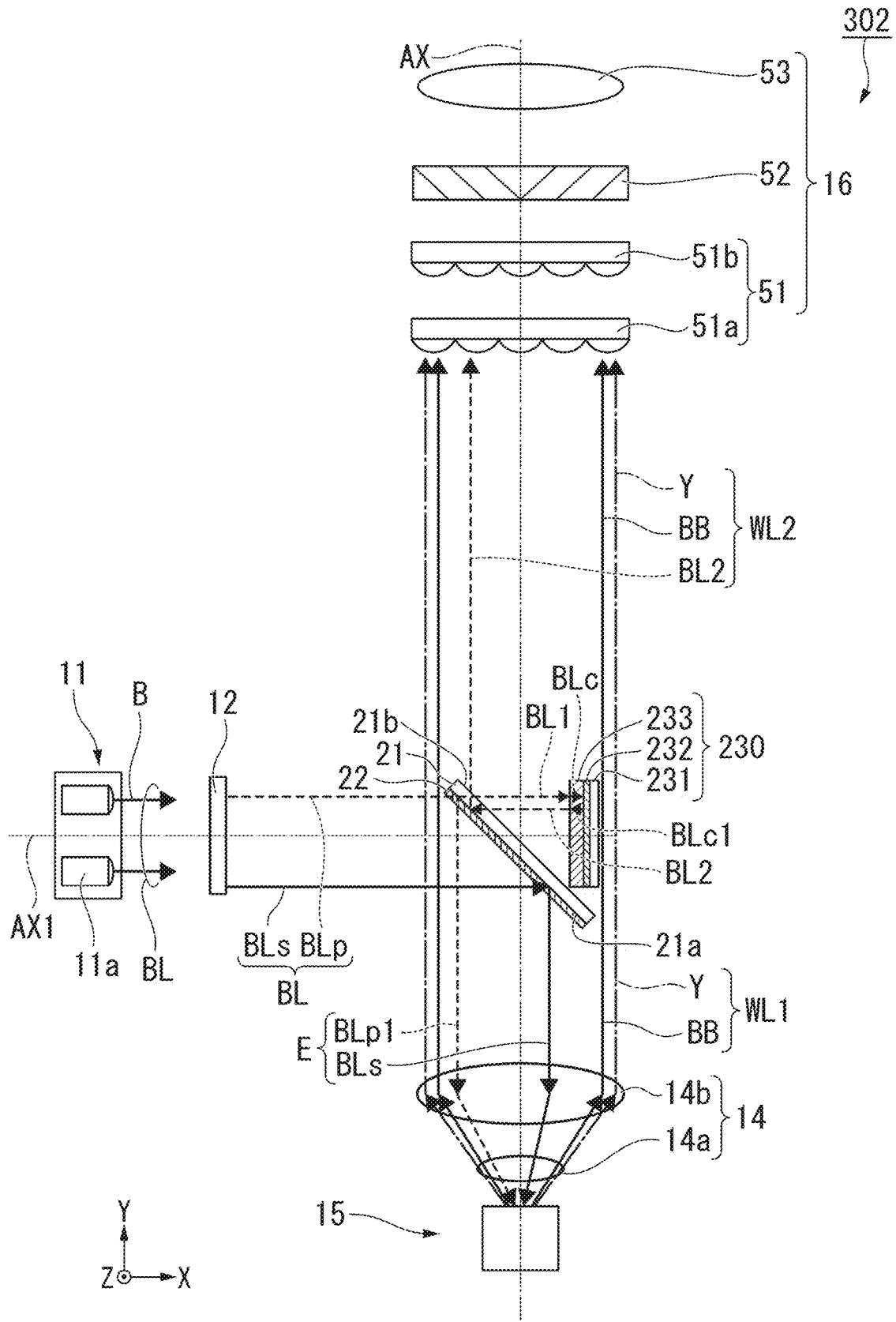
FIG. 9 is a schematic configuration diagram of an illuminator according to a third embodiment.

FIG. 9 is a schematic configuration diagram of an illuminator 302 according to the present embodiment.

The illuminator 302 according to the present embodiment includes the light source 11, the diffuser 12, the pickup system 14, the wavelength converter 15, the homogenized illumination system 16, the first optical element 20, and a second optical element 230, as shown in FIG. 9.

The second optical element 230 in the present embodiment is so disposed as to be perpendicular to the optical axis AX1 of the light source 11. In the plan view of the first optical element 20 viewed in the direction X or Y, the second optical element 230 is disposed in a position where the second optical element 230 is hidden behind the rear surface of the first optical element 20 so that the second optical element 230 is not visually recognized.

The second optical element 230 in the present embodiment includes a substrate 231, a reflection layer 232, and a retardation film 233. The reflection layer 232 is provided between the substrate 231 and the retardation film 233. The substrate 231 may or may not have light transmissivity. When the substrate 231 is made of metal, the reflection layer 232 can be omitted by allowing the surface of the substrate 231 to function as a reflection layer.

The retardation film 233 is formed of a ¼ wave plate ($\lambda/4$ plate). The retardation film 233 converts the P-polarized passing blue light BL1 having passed through the first optical element 20 into S-polarized light, as will be described later.

Since the passing blue light BL1 having passed through the first optical element 20 is P-polarized light and is therefore converted, for example, into right-handed circularly polarized light BLc when passing through the retardation film 233, and the right-handed circularly polarized light BLc is incident on the reflection layer 232. The reflection layer 232 is formed of a dichroic mirror provided at the surface of the substrate 231 and reflects the light (circularly polarized light BLc) having passed through the retardation film 233 toward the retardation film 233. The dichroic mirror that forms the reflection layer 232 is so characterized as to reflect the blue light BL and transmit the fluorescence Y.

The right-handed circularly polarized light BLc is converted into left-handed circularly polarized light BLc1 when reflected off the reflection layer 232, and the left-handed circularly polarized light BLc1 passes through the retardation film 233 again. The left-handed circularly polarized light BLc1 is converted into S-polarized light when passing through the retardation film 233. The passing blue light BL1 is converted into S-polarized passing blue light BL2 when sequentially traveling via the retardation film 233, the reflection layer 232, and the retardation film 233.

The second optical element 230 in the present embodiment converts the P-polarized light BLp having passed through the first optical element 20 into the S-polarized passing blue light BL2 and causes the S-polarized passing blue light BL2 to be incident on the first optical element 20 again. The first optical element 20 reflects the passing blue light BL2, which is the result of the conversion performed by the second optical element 230, in the traveling direction of the fluorescence Y that passes through the first optical element 20.

In the illuminator 302 according to the present embodiment, the second optical element 30 can convert the passing blue light BL1 having passed through the first optical element 20 into the S-polarized passing blue light BL2, and the first optical element 20 can then reflect the passing blue light BL2 in the traveling direction of the fluorescence Y.

That is, in the illuminator 302 according to the present embodiment, the blue diffused light BB and the fluorescent Y having passed through the area where the first optical element 20 is not provided, the fluorescent Y having passed through the first optical element 20 and the second optical element 230, and the passing blue light BL2 reflected off the first optical element 20 can be combined with one another into white illumination light WL2.

Effects of Third Embodiment

The illuminator 302 according to the present embodiment includes the light source 11, which outputs the blue light BL, the wavelength converter 15, which converts the blue light BL into the fluorescent Y, the first optical element 20, which reflects the S-polarized light BLs of the blue light BL and transmits at least part of the P-polarized light BLp of the blue light BL and the entire fluorescent Y, and the second optical element 230, which includes the retardation film 233, which converts the passing blue light BL1 having passed through the first optical element 20 into the S-polarized light BLs, and the reflection layer 232, which reflects the light having passed through the retardation film 233 toward the retardation film 233. The first optical element 20 reflects the passing blue light BL2, which is the result of the conversion performed by the second optical element 30, in the traveling direction of the fluorescence Y that passes through the first optical element 20.

In the illuminator 302 according to the present embodiment, the second optical element 30 can convert the P-polarized passing blue light BL1 having passed through the first optical element 20 into the S-polarized passing blue light BL2. The S-polarized passing blue light BL2 is reflected off the first optical element 20 in the traveling direction of the fluorescence Y to generate the illumination light WL2. The illuminator 302 according to the present embodiment, in which loss of the blue light BL outputted from the light source 11 can be reduced, can generate bright illumination light WL.

Fourth Embodiment

A fourth embodiment of the present disclosure will be described below with reference to the drawings.

The configuration of the projector according to the fourth embodiment is the same as that in the first embodiment but the configuration of part of the illuminator differs therefrom. The overall configuration of the projector and the common configuration of the illuminator will therefore not be described. The members and configurations common to those in the first embodiment have the same reference characters.

The difference between the present embodiment and the third embodiment is the positional relationship between the first optical element and the second optical element, and the present embodiment and the third embodiment are the same in other points. Only the key portions of the illuminator will be described below.

Figure 10:
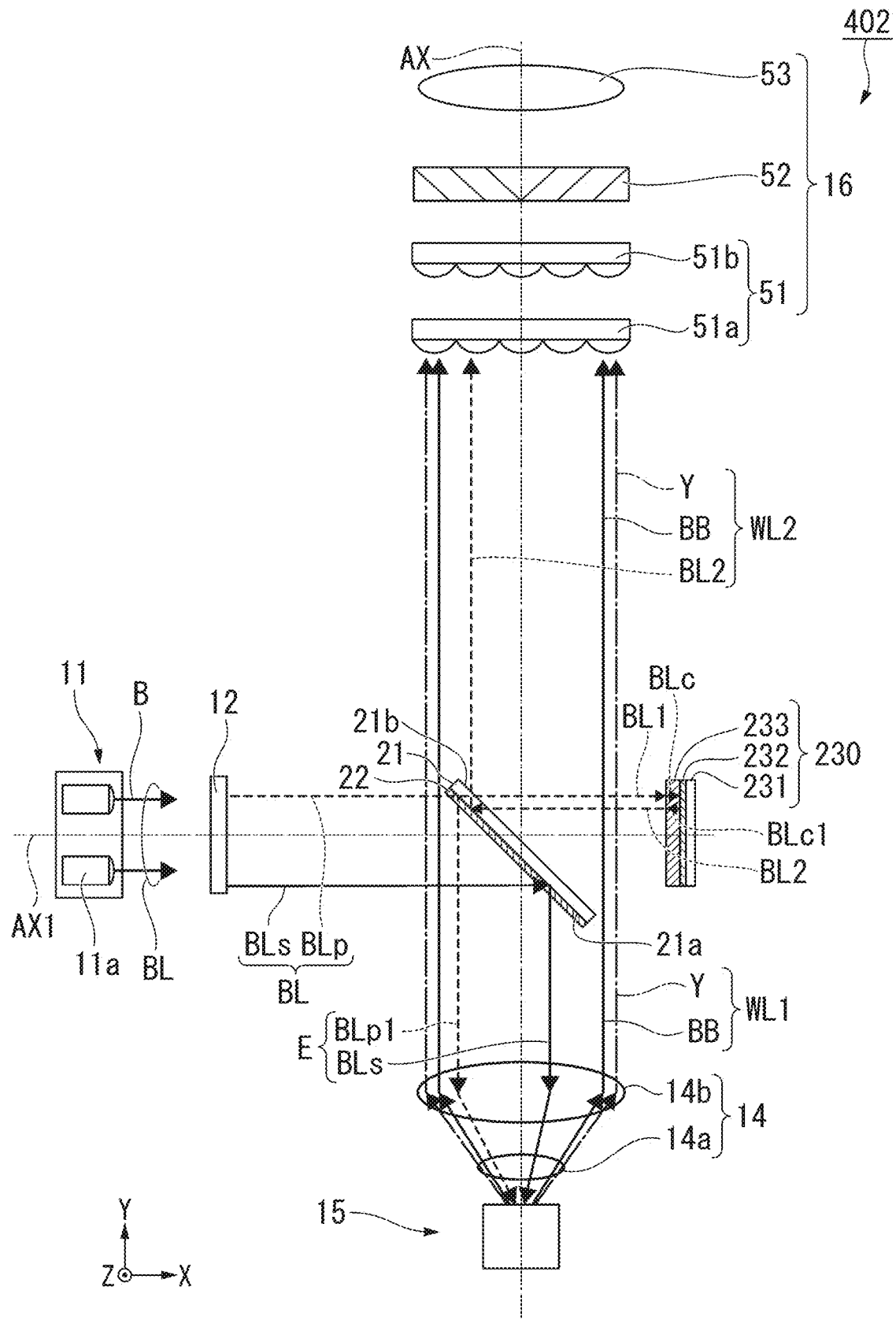
FIG. 10 is a configuration diagram of key parts of an illuminator according to a fourth embodiment.

FIG. 10 is a configuration diagram of key parts of an illuminator 402 according to the present embodiment.

In the illuminator 402 according to the present embodiment, the second optical element 230 is moved in the direction +X with respect to the first optical element 20 as compared with the configuration of the illuminator 302 according to the third embodiment, as shown in FIG. 10.

Specifically, the second optical element 230 is disposed outside the optical path of the light WL1 emitted from the wavelength converter 15 and traveling toward the first optical element 20. In the plan view of the first optical element 20 viewed in the direction X, the second optical element 230 is so disposed as to be hidden behind the rear surface of the first optical element 20.

Effects of Fourth Embodiment

In the illuminator 402 according to the present embodiment, since the second optical element 230 is disposed outside the optical path of the light WL1 emitted from the wavelength converter 15 and traveling toward the first optical element 20, the fluorescence Y contained in the light WL1 is not incident on the second optical element 230.

The second optical element 230 is so characterized as to transmit the fluorescence Y, but the fluorescence Y is slightly lost when passing through the second optical element 230.

The illuminator 402 according to the present embodiment can therefore prevent the loss that occurs when the fluorescence Y passes through the second optical element 230.

Further, since the second optical element 230 is not disposed in the optical path of the fluorescent Y, a film specialized in the function of reflecting only blue light can be used as the film that forms the reflection layer 232 of the second optical element 230, and the reflection layer 232 can be readily designed.

The technical scope of the present disclosure is not limited to the embodiments described above, and a variety of changes can be made thereto to the extent that the changes do not depart from the substance of the present disclosure.

For example, in the above embodiments, the wavelength converter 15 employs an immobile structure in which the wavelength conversion layer 43 does not move relative to the blue light BL, and a wheel-based structure in which the wavelength conversion layer 43 rotates relative to the blue light BL may be employed.

In addition to the above, the specific descriptions of the shape, the number, the arrangement, the material, and other factors of the components of the illuminators and the projectors are not limited to those in the embodiments described above and can be changed as appropriate. The above embodiments have been described with reference to the case where the illuminators according to the present disclosure are each incorporated in a projector using liquid crystal light valves, but not necessarily. The illuminators according to the present disclosure may each be incorporated in a projector using a digital micromirror device as each of the light modulators. The projector may not include a plurality of light modulators and may instead include only one light modulator.

The above embodiments have been described with reference to the case where the illuminators according to the present disclosure are each incorporated in a projector, but not necessarily. The illuminators according to the present disclosure can each be used as a lighting apparatus, a headlight of an automobile, and other components.

An illuminator according to an aspect of the present disclosure may have the configuration below.

An illuminator according to a first aspect of the present embodiment includes a light source that outputs first light having a first wavelength band, a wavelength converter that converts the first light into second light having a second wavelength band different from the first wavelength band, a first optical element that reflects part of the first light having the first wavelength band to cause the reflected light to be incident on the wavelength converter and transmits the other part of the first light having the first wavelength band and the second light having the second wavelength band and emitted from the wavelength converter, and a second optical element that reflects the other part of the first light having the first wavelength band and having passed through the first optical element, the direction of the reflected light being the traveling direction of the second light having the second wavelength band and having passed through the first optical element, and transmits the second light having the second wavelength band and emitted from the wavelength converter.

In the illuminator according to the first aspect of the present disclosure, the first optical element may be configured to reflect light that is part of the first light and is formed of a first polarized component polarized in a first direction and transmit at least part of light that is part of the first light and is formed of a second polarized component polarized in a second direction that intersects the first direction.

In the illuminator according to the first aspect of the present disclosure, the second optical element may include a plurality of reflectors that are in contact with the first optical element, and the plurality of reflectors may be disposed in different positions in a third direction that intersects the optical axis of the light source.

An illuminator according to a second aspect of the present embodiment includes a light source that outputs first light having a first wavelength band, a wavelength converter that converts the first light into second light having a second wavelength band different from the first wavelength band, a first optical element that reflects light that is part of the first light and is formed of a first polarized component polarized in a first direction and transmits the second light and at least part of light that is part of the first light and is formed of a second polarized component polarized in a second direction that intersects the first direction, and a second optical element that includes a retardation film that converts the light formed of the second polarized component and having passed through the first optical element into the light formed of the first polarized component and a reflection layer that reflects the light having passed through the retardation film toward the retardation film, and the first optical element reflects the light formed of the first polarized component that is the result of the conversion performed by the second optical element, the direction of the reflected light being the traveling direction of the second light that passes through the first optical element.

In the illuminator according to the aforementioned aspect of the present disclosure, in the plan view of the first optical element viewed along the optical axis of the second light emitted from the wavelength converter, the second optical element may be so disposed as to be hidden behind the rear surface of the first optical element.

In the illuminator according to the aforementioned aspect of the present disclosure, in the plan view of the first optical element viewed along the optical axis of the first light outputted from the light source, the second optical element may be so disposed as to be hidden behind the rear surface of the first optical element.

In the illuminator according to the aforementioned aspect of the present disclosure, the wavelength converter may include a wavelength conversion layer that converts the first light into the second light, a reflection layer that is provided at a first surface of the wavelength conversion layer, and a structural element that is provided at a second surface of the wavelength conversion layer.

A projector according to another aspect of the present disclosure may have the configuration below.

The projector according to the other aspect of the present disclosure may include the illuminator according to the aforementioned aspect of the present disclosure, a light modulator that modulates the light from the illuminator in accordance with image information, and a projection optical apparatus that projects the light modulated by the light modulator.

What is claimed is:

1. An illuminator comprising:
a light source that outputs first light having a first wavelength band;
a wavelength converter that converts the first light into second light having a second wavelength band different from the first wavelength band;
a first optical element that reflects part of the first light having the first wavelength band to cause the reflected light to be incident on the wavelength converter and transmits another part of the first light having the first wavelength band and the second light having the second wavelength band and emitted from the wavelength converter; and
a second optical element that reflects the other part of the first light having the first wavelength band and passing through the first optical element, a direction of the reflected light being a traveling direction of the second light having the second wavelength band and passing through the first optical element, and transmits the second light having the second wavelength band and emitted from the wavelength converter.

2. The illuminator according to claim 1,
wherein the first optical element reflects light that is part of the first light and is formed of a first polarized component polarized in a first direction and transmits at least part of light that is part of the first light and is formed of a second polarized component polarized in a second direction that intersects the first direction.

3. The illuminator according to claim 1,
wherein the second optical element includes a plurality of reflectors that are in contact with the first optical element, and
the plurality of reflectors are disposed in different positions in a third direction along an optical axis of the light source and a fourth direction that intersects the optical axis of the light source.

4. An illuminator comprising:
a light source that outputs first light having a first wavelength band;
a wavelength converter that converts the first light into second light having a second wavelength band different from the first wavelength band;
a first optical element that reflects light that is part of the first light and is formed of a first polarized component polarized in a first direction and transmits the second light and at least part of light that is part of the first light and is formed of a second polarized component polarized in a second direction that intersects the first direction; and
a second optical element that includes a retardation film that converts the light formed of the second polarized component and passing through the first optical element into the light formed of the first polarized component and a reflection layer that reflects the light passing through the retardation film toward the retardation film,
wherein the first optical element reflects the light that is formed of the first polarized component and is the result of the conversion performed by the second optical element, the direction of the reflected light being the traveling direction of the second light that passes through the first optical element, and
in a plan view of the first optical element viewed along an optical axis of the wavelength converter, the second optical element is so disposed as to be hidden behind a rear surface of the first optical element.

5. The illuminator according to claim 1,
wherein in a plan view of the first optical element viewed along an optical axis of the wavelength converter, the second optical element is so disposed as to be hidden behind a rear surface of the first optical element.

6. The illuminator according to claim 1,
wherein in a plan view of the first optical element viewed along an optical axis of the light source, the second optical element is so disposed as to be hidden behind a rear surface of the first optical element.

7. The illuminator according to claim 1,
wherein the wavelength converter includes
a wavelength conversion layer that converts the first light into the second light,
a reflection layer that is provided at a first surface of the wavelength conversion layer, and
a structural element that is provided at a second surface of the wavelength conversion layer.

8. A projector comprising:
the illuminator according to claim 1;
a light modulator that modulates light from the illuminator in accordance with image information; and
a projection optical apparatus that projects the light modulated by the light modulator.

9. The illuminator according to claim 4,
wherein the second optical element is disposed inside an optical path of the second light emitted from the wavelength converter.

10. The illuminator according to claim 4,
wherein in a plan view of the first optical element viewed along an optical axis of the light source, the second optical element is so disposed as to be hidden behind a rear surface of the first optical element.

11. The illuminator according to claim 4,
wherein the wavelength converter includes
a wavelength conversion layer that converts the first light into the second light,
a reflection layer that is provided at a first surface of the wavelength conversion layer, and
a structural element that is provided at a second surface of the wavelength conversion layer.

12. A projector comprising:
the illuminator according to claim 4;
a light modulator that modulates light from the illuminator in accordance with image information; and
a projection optical apparatus that projects the light modulated by the light modulator.

* * * * *